United States Patent [19]

Fitzmayer

[11] 3,974,696

[45] Aug. 17, 1976

[54] FOOD THERMOMETER FOR MICROWAVE OVEN

[75] Inventor: Louis H. Fitzmayer, Louisville, Ky.

[73] Assignee: General Electric Company, Louisville, Ky.

[22] Filed: Sept. 23, 1975

[21] Appl. No.: 616,050

Related U.S. Application Data

[63] Continuation-in-part of Ser. No. 446,169, Feb. 27, 1974, abandoned.

[52] U.S. Cl. .............................. 73/352; 73/362 AR; 99/342; 99/421 TP; 219/10.55 E; 333/73 C
[51] Int. Cl.² ...................... G01K 1/08; G01K 7/24; G08B 21/00
[58] Field of Search .............. 73/352, 359, 362 AR; 99/342, 421 TP; 219/10.55 D, 10.55 E, 10.55 F, 10.55 R, 450; 340/227 R, 228 R, 227.1, 233; 333/73 C, 73 R

[56] References Cited
UNITED STATES PATENTS

| | | | |
|---|---|---|---|
| 2,557,567 | 6/1951 | Rumsey et al. | 333/73 C |
| 2,689,294 | 9/1954 | Weber et al. | 73/362 AR X |
| 3,177,335 | 4/1965 | Fitzmayer et al. | 219/10.55 |
| 3,197,720 | 7/1965 | Dehn | 333/73 R |
| 3,271,651 | 9/1966 | Diederich | 73/359 |
| 3,511,958 | 5/1970 | Staats | 333/73 C X |
| 3,626,135 | 12/1971 | Fitzmayer | 333/73 C X |
| 3,742,397 | 6/1973 | Fitzmayer | 333/73 C X |
| 3,778,798 | 12/1973 | Heit | 99/342 X |
| 3,815,113 | 6/1974 | Welch | 340/233 X |

OTHER PUBLICATIONS

Kaftanov, S. V. et al., *Measuring the Temperature of Granulated Carbon in a High-Frequency Field*, In *Ind. Lab. (USA)*, vol. 38, No. 11, (Nov. 1972), pp. 1723-1724.
The ARRL Antenna Book, C. 1960, The American Radio Relay League, Inc., Chapter 3, pp. 106-108.

*Primary Examiner*—Richard C. Queisser
*Assistant Examiner*—Frederick Shoon
*Attorney, Agent, or Firm*—Steven C. Schnedler; Francis H. Boos; Richard L. Caslin

[57] ABSTRACT

Apparatus is disclosed for monitoring the internal temperature of food being cooked in the cooking cavity of a microwave oven with microwaves of a predetermined frequency having a predetermined wavelength λ. The apparatus includes a needle-like temperature-sensing probe adapted for insertion into the food being cooked, the probe including a thermally-responsive electrical element positioned internally of the probe housing near the tip end. A flexible shielded cable having first and second ends and generally extending between the probe and the cooking cavity wall connects the probe to circuitry responsive to thermally-induced changes in a characteristic of the electrical element, and includes chokes at either or both ends of the cable, the chokes presenting a high impedance to microwave energy of wavelength λ. The cable length is selected to be approximately equal to $n\lambda/2$, where $n$ is any integer, when one choke is used, and approximately equal to $n\lambda/4$, where $n$ is any odd integer, when two chokes are used. Resonant conditions, high attendant induced currents along the probe and cable, and direct heating of the probe and cable by the microwave energy are thereby minimized.

14 Claims, 6 Drawing Figures

FOOD THERMOMETER FOR MICROWAVE OVEN

CROSS-REFERENCE TO RELATED APPLICATION

This is a continuation-in-part of application Ser. No. 446,169, filed Feb. 27, 1974, by Louis H. Fitzmayer, entitled "Food Thermometer For Microwave Oven," now abandoned, and assigned to the same assignee as the present invention.

BACKGROUND OF THE INVENTION

1. Field of the Invention

The present invention relates to temperaturemonitoring apparatus and more particularly to such apparatus for monitoring the internal temperature of food being cooked in a microwave oven.

2. Description of the Prior Art

It is a desirable feature to include, in an oven, apparatus for monitoring the internal temperature of the food while it is being cooked. Such apparatus permits food to be cooked more accurately to a desired degree of doneness than would be the case either if a predetermined length of cooking time were employed or if a conventional mercury-type thermometer were employed. The former requires an accurate estimate of cooking time based upon oven temperature, in the case of a conventional oven, or upon microwave power level, in the case of a microwave oven, and, additionally, upon size and type of the food, in either a conventional or a microwave oven. The latter requires that the user of the oven periodically check the temperature reading, and is not readily adaptable for use in a microwave oven.

Electrical thermometers for monitoring internal temperature of food while it is being cooked have been developed for use in conventional ovens. Examples are disclosed in U.S. Pat. No. 3,778,798-Heit and U.S. Pat. No. 3,815,113-Welch. Electrical thermometers of the above-mentioned type comprise a needle-like probe adapted to be driven into the food, a temperature-sensing thermistor contained within the probe and located near the tip thereof, and a flexible cable connecting the probe to electrical circuitry within the oven, the electrical circuitry serving to either indicate the actual internal temperature of the food or to actuate a buzzer when a preset temperature is reached. In order that the electrical thermometer may be removed from the oven when it is not being used, the probe and cable are electrically connected to the electrical circuitry through a connector mounted on an interior wall of the oven cooking cavity.

Electric thermometer probes of the above-described type operate well in a conventional gas or electric oven. However, such probes, designed for use in a conventional oven, do not operate well when used in a microwave oven. The desired heating of food in a microwave oven occurs when the food, which is placed in the cooking cavity of the oven, "loads" or absorbs microwave energy, converting the energy into heat. Undesirably, food temperature-sensing probes of the conventional type also load in a microwave oven. This results in undesired high electrical currents flowing along the probe and cable and consequent undesired heating of the probe and cable. In particular, "hot spots" are produced at particular points along the cable and probe. This heating of the probe by direct action of the microwave energy, rather than solely by heat conducted from the food which is being cooked, causes the thermistor to sense a temperature which is higher than the actual internal temperature of the food. This results in a premature indication of doneness, a serious deficiency. Additionally, direct heating of the cable and the connector mounted on the interior wall of the cooking cavity results in a higher cable and connector temperature than would otherwise be the case. Such higher temperature can shorten the life span of the cable and the connector and may make them comfortably hot for the user of the oven to handle.

Such problems when a conventional temperaturesensing probe is used in a microwave oven can be minimized, but not eliminated, by measures such as providing the best possible thermal contact between the food being cooked and the probe so that heat produced in the probe by direct action of the microwave energy is dissipated, as much as is possible, into the food, or operating the oven at a lower microwave power level when the probe is being used. However, such measures are a compromise at best because some self-heating of the cable and probe still results and, further, the use of a lower microwave power level lengthens the required cooking time.

One approach to monitoring the temperature of a substance being heated in a high-frequency field is disclosed in an article by Kaftanov, S. D., et al., "Measuring the Temperature of Granulated Carbon Material in a High-Frequency Field," Ind. Lab. (USA), Vol. 38, No. 11, (November 1972), pp 1723–1724.

The article discusses some problems caused by direct heating of a temperature-sensing thermocouple by high-frequency energy. Additionally, the Kaftanov article discusses particular problems caused by arcing between adjacent carbon particles and between the probe tip and the carbon particles, which problems would not normally be present when the internal temperature of cooking food is being monitored. The Kaftanov article discloses a special thermocouple probe which includes a graphite screen filled with liquid tin to shield the thermocouple from direct heating by the high-frequency energy and to minimize arcing. Further, to shield the indicating circuitry from highfrequency interference, a special high-frequency filter comprising two shorted and two open-circuited sections of a coaxial quarter wavelength cable is inserted in series with each of the two thermocouple leads, and three LC sections in series are connected to the case of the indicating circuitry just before the thermocouple lead terminals. Such apparatus is complex and not readily adaptable for monitoring the internal temperature of food being cooked in a microwave oven.

U.S. Pat. No. 3,177,335-Fitzmayer et al. discloses a thermostat probe for measuring the ambient temperature in an oven of the type which cooks food using either conventional radiant energy or microwave energy, or both. The thermostat probe is used to control the operation of the conventional radiant heating energy elements. The thermostat is of the hydraulic type having a capillary tube leading into the oven cavity and terminating in a temperature-sensing bulb. It is necessary that the thermostat probe be insensitive to microwave energy and to respond only to ambient temperature within the oven cooking cavity. To this end, the probe is supported by a support having a plurality of spaced grounding points, the spacing between the grounding points being different than one quarter of the wavelength of the microwave energy or any odd multiple of one quarter wavelength of the microwave energy, so as to prevent the thermostat probe from creating a series-resonant loop at the frequency of the microwave energy. Such a configuration, relying upon a plurality of spaced grounding points, would not be suitable for a food temperature-sensing probe and cable assembly which, as a practical matter, is connected to the cooking cavity wall only at one end and to the food at the other end.

An example of food temperature-monitoring apparatus which is suitable for use in a microwave oven is disclosed and claimed in co-pending application Ser. No. 616,049, filed Sept. 23, 1975, by David Y. Chen and Louis H. Fitzmayer, and entitled "Food Thermometer for Microwave Oven," which application is a continuation-in-part of co-pending application Ser. No. 447,087, filed Mar. 1, 1974, each of the above mentioned applications being assigned to the same assignee as the present invention, and now abandoned. In the abovementioned Chen and Fitzmayer applications, there is disclosed apparatus including a temperature-sensing probe and a flexible sheilded cable connected at one end to the probe housing and at the other end to the wall of the cooking cavity. The total effective electrical length of the probe and the cable, measured along the cable and probe from the cooking cavity wall to the distal end of the probe, is selected to be an integer multiple of one-half the wavelength of the microwave energy. Resonant conditions, high attendant induced currents along the probe and cable, and direct heating of the probe and cable by the microwave energy are thereby minimized.

By the present invention, there are provided alternative forms of temperature-monitoring apparatus for monitoring the internal temperature of food while it is being cooked in a microwave oven, which alternative forms also minimize resonant conditions and attendant high induced currents and heating along the cable. In particular, the present invention is useful in a microwave oven operating at a frequency of 915 MHz.

SUMMARY OF THE INVENTION

It is an object of the invention to provide electrical apparatus of the probe and cable type for accurately monitoring the internal temperature of food while it is being cooked in a microwave oven.

It is another object of the invention to provide such apparatus which minimizes heating of the probe and of the cable by direct action of the microwave energy, thereby avoiding a premature indication of doneness.

These and other objects are accomplished by apparatus according to the present invention, which apparatus includes a temperature-sensing probe adapted for insertion into the food being cooked by microwave energy of a predetermined wavelength $\lambda$, the probe including an elongated conductive housing, the distal end of which is closed and shaped to facilitate insertion into the food and the probe further including a thermally-responsive electrical element positioned internally of the housing near the distal end. Apparatus, according to the invention, further includes circuitry responsive to thermally-induced changes in a characteristic of the electrical element included in the probe, the circuitry producing a control effect indicative of the internal temperature of the food. A flexible shielded cable having first and second ends and generally extending between the probe housing and a cooking cavity wall connects the electrical element to the circuitry.

A first embodiment of the invention further includes a choke for presenting a high impedance to microwave energy of wavelength $\lambda$, the choke being coupled to the cable shielded at the second end of the cable shield to electrically isolate the second end of the cable shield from the cooking cavity wall at the predetermined microwave frequency. The total effective length of the cable, measured along the cable from said choke to said probe housing, is selected to be approximately equal to $n\lambda/2$, where $n$ is any integer.

A second embodiment of the invention adds, to the above-described first embodiment, another choke which is coupled to the cable shield at the first end thereof nearest the probe to electrically isolate the first end of the cable shield from the probe housing. In the second embodiment of the invention, the total effective electrical length of the cable, measured along the cable between said first and second chokes, is selected to be approximately equal to $n\lambda/4$, where $n$ is any odd integer.

A third embodiment of the invention includes a choke coupled to the cable shield at the first end thereof nearest the probe to electrically isolate the first end of the cable shield from the probe housing but no choke at the second end of the cable. The second end of the cable shield is connected directly to the cooking cavity wall. In the third embodiment of the invention, the total effective electrical length of the cable, measured along the cable from the cooking cavity wall to the choke, is selected to be approximately equal to $n\lambda/2$, where $n$ is any integer.

When the cable length is selected as described above for the first, second and third embodiments of the invention, resonant conditions and attendant high induced currents along the cable shield caused by the microwave energy are minimized. As a result, the probe and cable assembly may successfully be operated in a microwave oven while maintaining the accuracy of the food temperature indication.

BRIEF DESCRIPTION OF THE DRAWINGS

While the novel features of the invention are set forth with particularly in the appended claims, the invention, both as to organization and content, will be better understood and appreciated, along with other objects and features thereof, from the following detailed description taken in conjunction with the drawings, in which:

DESCRIPTION OF THE PREFERRED EMBODIMENTS

Figure 1:
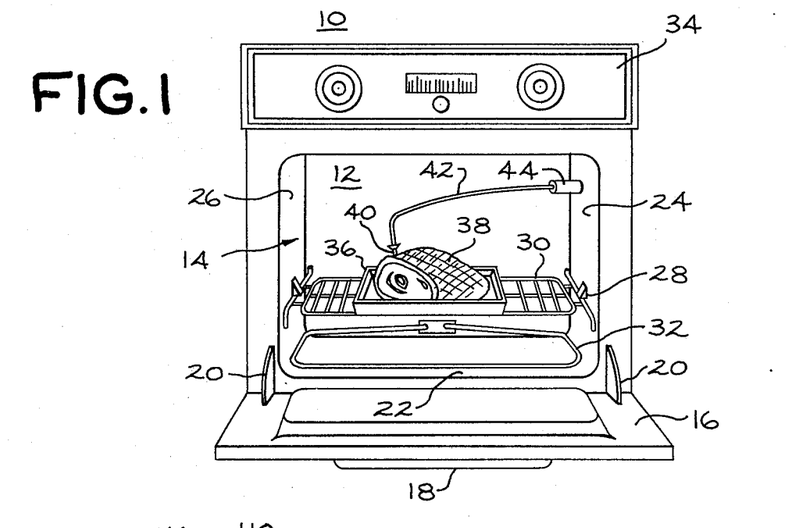
FIG. 1 is a front elevational view of a microwave oven shown with the oven door open and illustrating food temperature monitoring apparatus constructed in accordance with the embodying features of a first embodiment of the present invention.

Referring first to FIG. 1 of the drawings, there is illustrated a microwave oven, generally designated by the numeral 10, including a food thermometer system constructed in accordance with and embodying the features of a first embodiment of the present invention. The oven 10 is a standard microwave oven and, while a built-in wall oven is shown for purposes of illustration, it will be understood that any desired type of microwave oven may be used. The oven 10 is of standard construction having an oven cooking cavity 12 formed by a box-like oven liner 14 and a front-opening access door 16, which door is shown in FIG. 1 in its horizontal, fully open position. The door 16 has a door handle 18 arranged along its top edge and hinge straps 20 at the bottom corners for hingedly supporting the door from the oven body.

The oven liner 14 has a bottom wall 22 and opposite cavity side walls 24 and 26 which are formed with rack supports or ledges 28. A slidable food supporting rack 30 is suspended between the rack supports 28. A lower baking element 32 is positioned adjacent the bottom wall 22 of the oven liner, and there is normally also provided a top baking or broiling element (not shown) positioned adjacent the top wall of the oven liner as is conventional in the electric oven art, especially domestic ovens for use in the home. The heating elements, such as the baking element 32 are elongated metal sheathed, electrical resistance heating elements of rather small diameter and are formed into a large loop or a large serpentine shape.

The oven 10 is also provided with a magnetron for generating microwaves of a predetermined frequency, preferably 915 MHz, and a transmission line for transmitting the microwave energy from the output of the magnetron to the cooking cavity 12. A control panel 34 is provided at the front of the oven 10 above the heating cavity.

The oven rack 30 supports a shallow container 36 constructed of a material transparent to microwaves, such as a Pyrex dish, containing therein the food 38 to be cooked, shown for purposes of illustration as being a half of ham to be baked to an internal temperature of approximately 150°F. The cooking time required to heat the food 38 to the desired internal temperature is subject to many variables; for example, size and weight of the food, fat and bone content of the particular piece, and type of food. This variable cooking time, and the fact that the cooking time can only be estimated, is inconvenient and makes it difficult to accurately cook the food to a desired degree of doneness when there is no means for monitoring the internal temperature of the food while it is being cooked.

Apparatus according to a first embodiment of the invention includes a temperature-sensing probe 40 inserted into the ham 38, a flexible shielded cable 42, and a choke 44 for electrically isolating the cable shield from the cavity wall 24.

Figure 2:
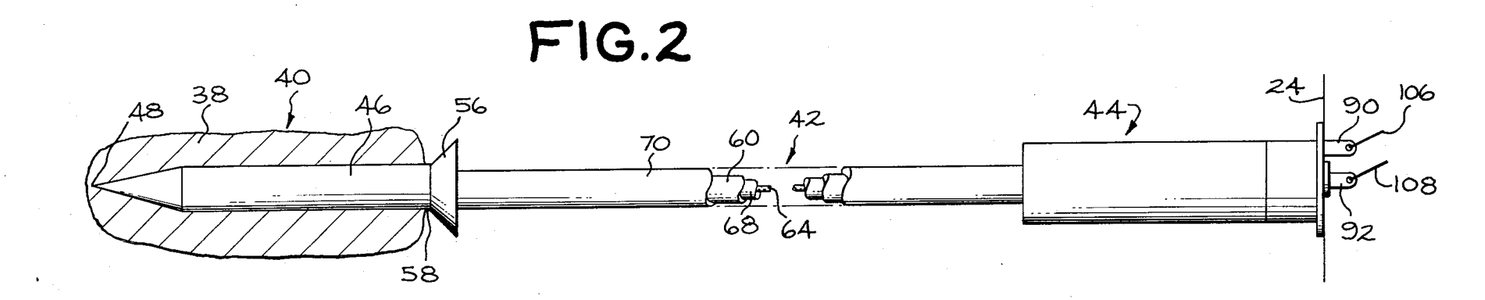
FIG. 2 is an enlarged side elevational view of the first embodiment of the temperature-sensing probe and cable structure of the present invention, with a part of the cable removed and with a choke shown at the cavity wall end of the cable.
Figure 3:
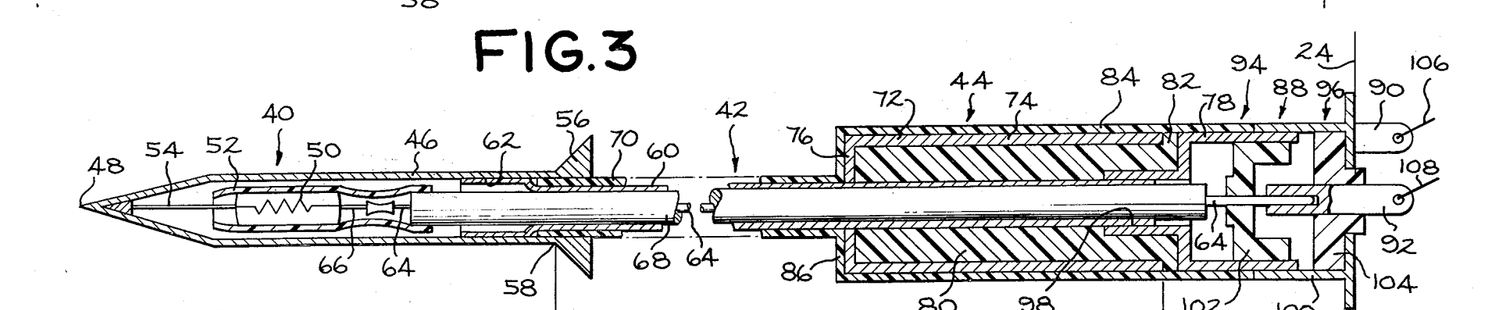
FIG. 3 is a further enlarged view in partial vertical section of the probe and cable structure illustrated in FIG. 2.

Referring now to FIGS. 2 and 3, constructional details of the probe 40, the flexible shielded cable 42, and the choke 44 are shown. The probe 40 includes an elongated conductive housing 46 having distal end 48 which is closed and shaped to facilitate insertion into the food 38. The probe 40 further includes a thermally responsive electrical element such as a thermistor 50 positioned internally of the housing 46 near the distal end 48. The thermistor 50 is supported within a shrinkable sleeve 52. A first lead 54 of the thermistor 50 is electrically and thermally connected to the probe housing 46 adjacent the distal end 48. As is conventional, heat conduction to the thermistor 50 is primarily along the first lead 54.

The probe 40 is provided with a handle portion 56, the handle portion 56 serving as a stop to limit the depth to which the probe housing may be inserted into the food load 38, the point on the probe housing 46 to which the probe 40 is inserted in the food 38 constituting a reference point, generally designated by the numeral 58. In a preferred embodiment of the invention, the probe housing 40 has a length of about 3.2 inches from the distal end 48 to the reference point 58, which length is approximately equal to one quarter of the wavelength $\lambda$ of the microwave energy at a frequency of 915 MHz.

The flexible shielded cable 42 is shown as a coaxial cable in FIGS. 2 and 3 and has an electrically conductive cable shield 60 electrically connected at a first end to the probe housing 46 at a point 62. This connection may be a crimp. Since the thermistor lead 54 is also connected to the probe housing 46, the cable shield 60 is electrically connected through the probe housing 46 to the thermistor lead 54. The cable 42 also includes an inner conductor 64 which is electrically connected to a second thermistor lead 66. The inner conductor 64 of the cable 42 is separated from the cable shield 60 by a layer of dielectric insulating material 68. Preferably, the cable shield 60 is surrounded by a layer of insulation 70, which may, for example, be a material such as polytetrafluorethylene, commonly sold under the trademark Teflon.

The choke 44 is coupled to the second end of the cable shield 60 to electrically isolate the cable shield 60 from the cavity wall 24 at the predetermined microwave frequency. The choke 44 may be any structure which presents a high impedance to microwave energy of wavelength $\lambda$, but preferably is made in the general form of a cavity having an effective electrical length equal to $n \lambda/4$, where $n$ is any odd integer, one end of the cavity being closed and the other open, the high impedance to microwave energy of wavelength $\lambda$ appearing across the open end of the cavity.

Referring now in particular in FIG. 3, details of the choke 44 are shown. The choke 44 includes a generally cup-shaped member 72 having a cylindrical side wall 74 surrounding the adjacent portion of the cable shield 60 coaxially therewith and spaced radially outwardly therefrom and an annular end wall 76 closing the side wall 74 at the end thereof disposed away from the end of the cable shield 60, the end wall 76 having a circular opening therein for receiving therethrough the cable shield 60 in electrical contact with the end wall 76. The cylindrical wall portion 74 of the cup-shaped member 72 has an outer diameter substantially equal to the outer diameter of a plug shell 78 and is spaced therefrom a predetermined distance axially of the cable 42.

Filling the space between the cable shield 60, the cup-shaped member 72 and the plug shell 78 is an annular body 80 of dielectric insulating material, the portion of the body 80 extending axially from the plug shell 78 to the open end of the cup-shaped member 72 defining a land portion 82 having an outer diameter substantially equal to the outer diameters of the plug shell 78 and the cylindrical wall 74. Disposed in surrounding relationship with the plug shell 78 and the choke structure 44 is a cylindrical sleeve 84 of dielectric insulating material, the sleeve 84 preferably having an integral annular flange portion 86 covering the end wall 76 of the cup-shaped member 72 and preferably being integral with the outer insulating layer 70 of the cable 42.

The cup-shaped member 72 cooperates with the adjacent portion of the cable shield 60 to define therebetween an annular cavity filled by the insulating body 80, the cavity having an effective electrical length equal to approximately $n \lambda/4$, where n is preferably one, but may be any odd integer. The axial gap between the cup-shaped member 72 and the plug shell 78 which is filled by the land portion 82 of the insulating body 80 is so dimensioned that the distance $D_1$ from the open end of the cup-shaped member 72 to the oven cavity side wall 24 is less than $\lambda/8$. In use, this gap provides a capacitive gap at the microwave frequency used, the quarter-wave cavity formed by the member 72 presenting a high impedance to microwave energy at that frequency, whereby the cable shield 60 is effectively isolated from the cavity wall 24.

The end of the cable shield 60 is electrically connected through a connector 88 to the cooking cavity side wall 24 and to a terminal 90. The inner conductor 64 of the cable 42 is connected through connector 88 to a terminal 92. Conventionally, the connector 88 includes a plug 94 and a receptacle 96. The plug 94 comprises the above-mentioned electrically-conductive shell 78 which is connected to the cable shield 60 at a connection point 98 and which mates with a corresponding electrically-conductive receptacle shell 100, the receptacle shell 100 being electrically connected both to the cooking cavity side wall 24 and to the terminal 90. The connection at point 98 may also be a crimp. As is conventional, the cooking cavity side wall 24 and, therefore, the terminal 90, the cable shield 60, and the probe housing 46 are all connected to a circuit reference point, for example, "ground". Disposed within the plug 94 and receptacle 96 are insulating bodies 102 and 104, respectively, for supporting the inner conductor 64 and the terminal 92. Leads 106 and 108 electrically connect the terminals 90 and 92 to circuitry (FIG. 5) responsive to thermally-induced changes in the resistance of the thermistor 50.

It will be apparent that the leads 106 and 108 are electrically connected through the connector 88, the cable 42, and the probe housing 46 to the thermistor leads 54 and 56. Additionally, the thermistor 50 is completely encased in a continuous conductive sheath including the probe housing 46 and the cable shield 60 so as to be shielded from direct heating by microwave energy.

Those skilled in the art will appreciate that the connection of the cable shield 60 to the cavity wall 24 is effective at DC and at most frequencies other than the predetermined microwave frequency, but that, at the microwave frequency, the choke 44 will nonetheless be effective to isolate the cable shield 60 from the cavity wall 24.

In the embodiment illustrated in FIGS. 2 and 3, the probe end of the cable 42 is terminated in a low impedance food load 38, while the other end of the cable 42 is terminated in the high impedance of the choke 44. The length $D_2$ of the cable 42 from the meat reference point 58 on the probe housing 46 to the open end of the choke member 72 is selected to be approximately equal to $n \lambda/2$, where n is any integer, whereby the cable 42 is non-resonant at the predetermined microwave frequency, thereby minimizing current flow in the cable 42 and probe 40 at that frequency. Furthermore, as mentioned above, since the thermistor 50 is completely encapsulated in a conductive enclosure, the thermistor 50 is completely shielded from the microwave energy, whereby the operation of the food thermometer system will be unaffected by the microwaves.

Figure 4:
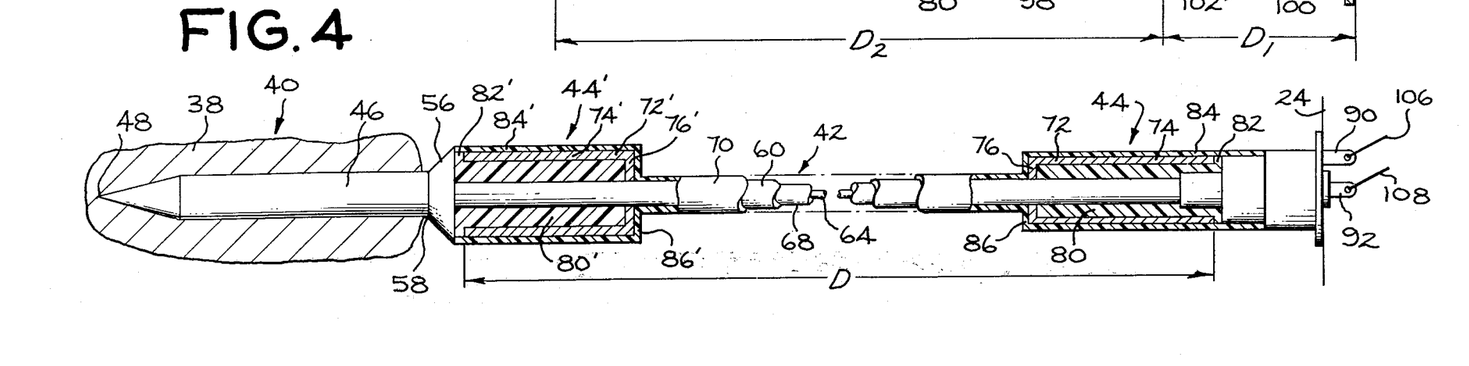
FIG. 4 is a view similar to FIG. 2 showing a second embodiment of the present invention, including a choke at each end of the cable.

Referring now to FIG. 4, there is illustrated a second embodiment of the present invention, the second embodiment including an additional choke 44' at the probe (first) end of the cable 42. The choke 44' is identical in construction to the choke 44 (FIG. 3) with like elements designated by primed reference numbers, so a detailed description thereof will not be repeated.

In the second embodiment illustrated in FIG. 4, both ends of the cable 42 are terminated in high impedances. In order to avoid resonant conditions, the length D of the cable 42, measured between the open ends of the cup-shaped members 72 and 72', is selected to be approximately equal to $n \lambda/4$, where n is any odd integer.

Figure 5:
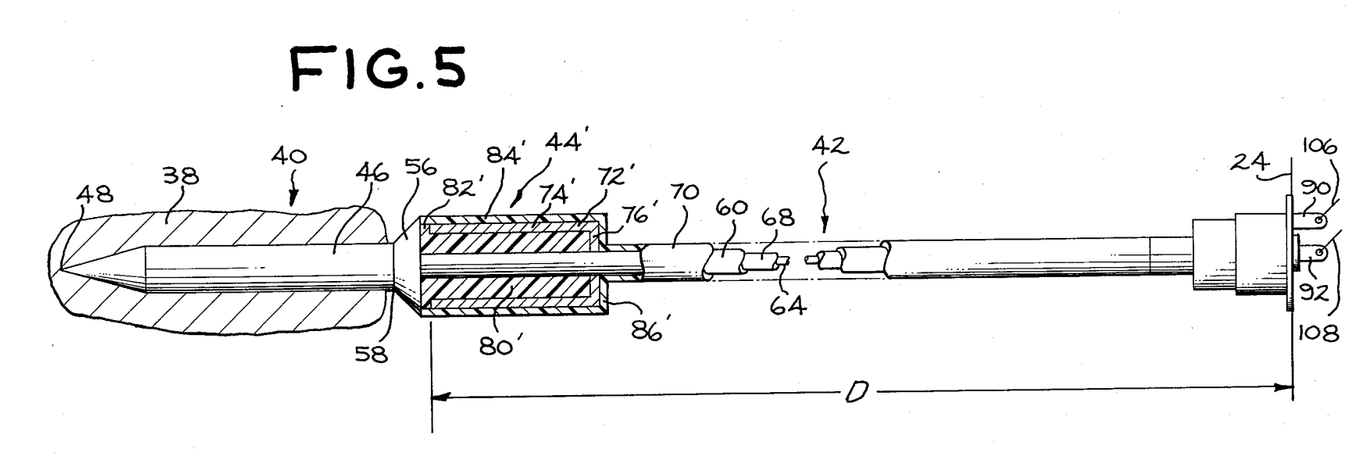
FIG. 5 is a view similar to FIG. 2 showing a third embodiment of the present invention, including a choke only at the probe end of the cable.

Referring now to FIG. 5, there is illustrated a third embodiment of the invention. The third embodiment includes only a choke 44' at the probe (first) end of the cable 42. As in FIG. 4, the choke 44' of FIG. 5 is identical in construction to the choke 44 (FIG. 3), with like elements designated by primed reference numbers, so the detailed description will not be repeated.

In the third embodiment illustrated in FIG. 5, the probe (first) end of the cable 42 is terminated in a high impedance presented by the choke 44'. The other end of the cable 42 is terminated in a low impedance, being connected to the cavity wall 24. In order to avoid resonant conditions, the length D of the cable 42, measured from the open end of the cup-shaped member 72' to the cavity wall 24, is selected to be approximately equal to $n \lambda/2$, where n is any integer.

Figure 6:
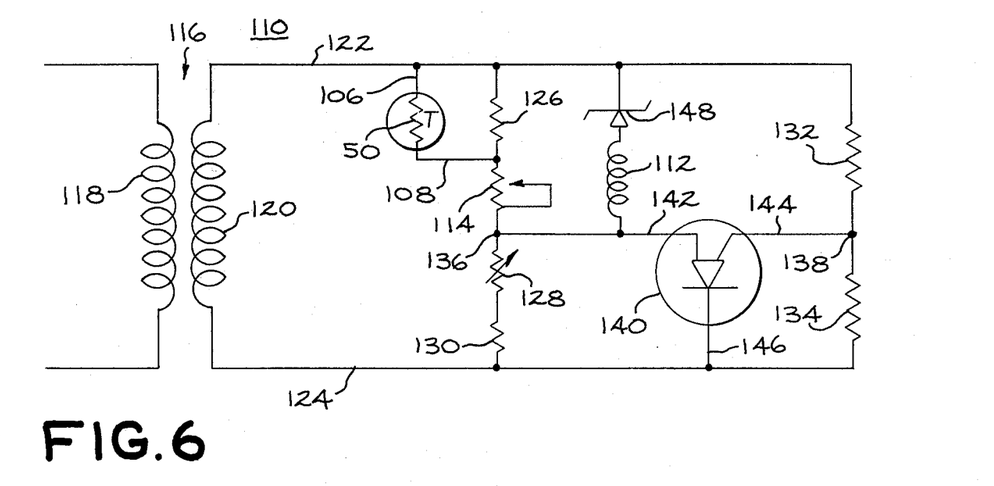
FIG. 6 is a schematic circuit diagram of circuitry which may be used in one embodiment of the present invention to produce a control effect indicative of the internal temperature of the food.

While in FIGS. 2 through 5 the flexible shielded cable 42 is shown as a coaxial cable, it will be understood that, according to the invention, any type of shielded cable may be used with equal effectiveness, so long as there is a substantially continuous conductive layer surrounding the thermistor 50 and connected to the cooking cavity side wall 24. A coaxial cable is used only as a matter of convenience in a preferred embodiment of the invention because the cable shield 60 may be employed as one of the conductors for electrically connecting the first lead 54 of the thermistor 50 to the circuitry (FIG. 6). However, the flexible shielded cable 42 may alternatively be a two-conductor shielded cable having two inner conductors and an outer shield, in which case the two inner conductors would be electrically connected to the thermistor leads 54 and 66 and the cable shield 60 would not be employed as one of the conductors for electrically connecting the thermistor 50 to the circuitry (FIG. 6). Another possible alternative construction for the shielded cable 42 would be a flexible hollow tubular cable shield and a single inner conductor passing therethrough, but not necessarily centered axially in the cable 42. The cable shield would be employed as one of the thermistor conductors. The cable dielectric insulation material 68 would not, if such a configuration were employed, completely fill the space within the cable shield 60. However, the essential requirements that the thermistor 50 be shielded from microwave energy, and that an electrical connection be made between the thermistor 50 and the circuitry (FIG. 6), would be satisfied.

It will be apparent to those skilled in the art that the electrical length of the probe and cable assembly may not be exactly the same as the actual physical length. This is due, in part, to the effect of cable and probe diameter, to "end effects," and to the fact that the velocity of microwaves propogating along the cable and probe may be different than the velocity in free space. As a result of these effects, and possibly others, a wavelength along the cable and probe may vary slightly from the predicted free space wavelength. The precise physical length required is not amenable to calculation, but is readily obtainable experimentally, the experimentation required being well within the skill of one skilled in the art.

Referring now to FIG. 6, there is shown circuitry, generally designated at 110, responsive to thermallyinduced changes in the resistance of the thermistor 50 to produce a control effect indicative of the internal temperature of the food 38. It will be understood that the circuitry 110 is exemplary only and may be any circuitry responsive to thermally-induced changes in a characteristic of the electrical element 50. The control effect may be, for example, the actuation of an audible alarm, the deenergizing of the microwave energy, or both. The particular circuitry 110 is that which is disclosed in the above-mentioned U.S. Pat. No. 3,778,798-Heit. While a brief description of the circuitry 110 follows, reference is hereby made to the above-mentioned U.S. Pat. No. 3,778,798-Heit for a more detailed description and explanation of the operation of the circuitry 110.

The circuitry 110 operates to energize a buzzer 112 when the temperature sensed by the thermistor 50 reaches or exceeds a preset temperature, the preset temperature being determined by the setting of a potentiometer 114. Alternatively, the buzzer 112 may be replaced by the coil of a relay having contacts arranged to de-energize the source of microwave energy when the temperature sensed by the thermistor 50 reaches or exceeds the preset temperature.

The circuitry 110 includes a voltage stepdown transformer 116 having a primary winding 118 for connection to 115 volt, 60 Hz power source, and producing, across a secondary winding 120, 24 volt AC power. Conductors 122 and 124 are connected across the secondary winding 120. A four-leg impedance bridge network comprising, in the first leg, a resistor 126 and the potentiometer 114; in the second leg, resistors 128 and 130; in the third leg, a resistor 132; and, in the fourth leg, a resistor 134, is connected between the conductors 122 and 124. The thermistor 50 is electrically included in the first leg by being connected, through the conductors 106 and 108, in parallel with the resistor 126. The bridge network further includes comparison terminals 136 and 138 at the junction of the first and second legs and at the junction of the third and fourth legs, respectively. A programmable unijunction transistor (PUT) 140 is connected between the comparison terminals 136 and 138 to serve as a threshold detector for the bridge network, the anode 142 of the PUT 140 being connected to the comparison terminal 136 and the gate 144 of the PUT 140 being connected to the comparison terminal 138. The cathode 146 of the PUT 140 is connected to the conductor 124. The buzzer 112 is connected in series with a zener diode 148 between the anode 142 and the conductor 122.

The thermistor 50 has a negative temperature coefficient so that when the sensed temperature is equal to or greater than the preset temperature, during positive half cycle AC line excursions (when the conductor 122 is positive with reference to the conductor 124) the anode 142 is biased positive with respect to the gate 144, causing the PUT 140 to become forward biased. Current then flows from the conductor 122, through the zener diode 148, through the buzzer 112 and through the anode-cathode junction of the PUT 140, to the conductor 124, thereby energizing the buzzer 112.

From the foregoing, it can be seen that there has been provided an improved food thermometer system which is particularly adaptable for use in a microwave oven. More particularly, there has been provided a food thermometer system of simple and economical construction which functions accurately to monitor the internal temperature of the food load being cooked, while preventing interference with the operation of the system by the microwave energy, particularly at 915 MHz.

Specifically, there has been provided an improved temperature monitoring apparatus which includes a temperature sensing element encased in a probe for insertion into the food and connected by a coaxial cable to an indicating means, the temperature sensing element being completely shielded from microwave energy, and the length of the connecting cable being selected so as to be non-resonant at the predetermined microwave frequency being used, there also being provided a choke coupled to the coaxial transmission line at either or both ends thereof for presenting a high impedance to the microwave energy.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. Apparatus for monitoring the internal temperature of food being cooked in the cooking cavity of a microwave oven with microwaves of a predetermined frequecy having a predetermined wavelength $\lambda$, said apparatus comprising:
   a. a temperature-sensing probe adapted for insertion into the food to be cooked, said probe including an elongated conductive housing having a reference point to indicate optimum insertion depth into the food, the distal end of said housing being closed and shaped to facilitate insertion into the food, and said probe further including a thermally-responsive electrical element positioned internally of said housing near the distal end;
   b. circuitry responsive to thermally-induced changes in a characteristic of said electrical element to produce a control effect indicative of the food temperature; and
   c. a flexible shielded cable connecting said electrical element to said circuitry, said cable having first and second ends and generally extending between said probe and a wall of the cooking cavity, said first end of the cable shield being connected to said probe housing; and
   d. a choke for presenting a high impedance to microwave energy of wavelength $\lambda$, said choke being coupled to the cable shield at said second end of the cable shield to electrically isolate said second end of the cable shield from the cooking cavity wall at the predetermined microwave frequency;

the total effective electrical length of said cable measured along said cable, from said choke to the reference point on said housing, being approximately equal to $n \lambda/2$, where $n$ is any integer, whereby in use the cable is non-resonant at said predetermined wavelength $\lambda$, said electrical element is completely shielded from microwave energy, and the cable shield is isolated from said cavity wall.

2. The apparatus of claim 1, wherein said choke comprises a cavity having an effective electrical length equal to $n \lambda/4$, where $n$ is any odd integer, one end of said cavity being closed and the other being open, a high impedance to microwave energy of the predetermined frequency appearing across the open end of said cavity.

3. The apparatus of claim 1, wherein said second end of the cable shield is connected to the cooking cavity wall;

said choke comprises a generally cup-shaped member having a cylindrical side wall surrounding the adjacent portion of said cable shield coaxially therewith and spaced therefrom, and an end wall closing said cylindrical side wall at the end thereof disposed away from said second end of the cable shield and connected to the cable shield, the other end of said cylindrical wall being open, and said cylindrical side wall having an effective electrical length equal to $n \lambda/4$ where $n$ is any odd integer; and the length of said cable is measured along said cable from the open end of said cylindrical wall of said choke to the reference point on said housing.

4. The apparatus of claim 3, wherein said open end of said cylindrical side wall is spaced a distance of less than $\lambda/8$ from the cooking cavity wall.

5. The apparatus of claim 1, wherein the length of said probe housing measured from said insertion depth reference point to the distal end of said housing is approximately equal to $\lambda 14$.

6. The apparatus of claim 1, wherein the predetermined frequency is 915 MHz and the predetermined wavelength $\lambda$ is 12.9 inches.

7. The apparatus of claim 1, wherein said choke and said cable are surrounded by a continuous layer of dielectric material.

8. Apparatus for monitoring the internal temperature of food being cooked in the cooking cavity of microwave oven with microwaves of a predetermined frequency having predetermined wavelength $\lambda$, said apparatus comprising:

a. a temperature-sensing probe adapted for insertion into the food to be cooked, said probe including an elongated conductive housing, the distal end of which is closed and shaped to facilitate insertion into the food, and said probe further including a thermally-responsive electrical element positioned internally of said housing near the distal end;

b. circuitry responsive to thermally-induced changes in a characteristic of said electrical element to produce a control effect indicative of the food temperature; and c. a flexible shielded cable connecting said electrical element to said circuitry, said cable having first and second ends and generally extending between said probe and a wall of the cooking cavity;

d. a first choke for presenting a high impedance to microwave energy of wavelength $\lambda$, said first choke being coupled to the cable shield at the first end thereof nearest said probe to electrically isolate said first end from said probe housing at the predetermined microwave frequency;

e. a second choke for presenting a high impedance to microwave energy of wavelength $\lambda$, said second choke coupled to the cable shield at the second end thereof nearest the cavity wall to electrically isolate said second end from the cavity wall at the predetermined microwave frequency;

the total effective electrical length of said cable, measured along the cable from said first choke to said second choke, being approximately equal to $n \lambda/4$, where $n$ is any odd integer, whereby in use the cable is nonresonant at said predetermined wavelength $\lambda$, said electrical element is completely shielded from microwave energy, and the cable shield is isolated at both ends.

9. The apparatus of claim 8, wherein said first end of the cable shield is connected to the probe housing and said second end of the cable shield is connected to the cooking cavity wall;

said first choke comprises a first generally cup-shaped member having a first cylindrical side wall surrounding the adjacent portion of said cable shield coaxially therewith and spaced therefrom, and an end wall closing said first cylindrical side wall at the end thereof disposed away from said first end of the cable shield and connected to the cable shield, the other end of said first cylindrical wall being open, and said cylindrical side wall having an effective electrical length equal to $n \lambda/4$, where $n$ is any odd integer;

said second choke comprises a second generally cup-shaped member having a first cylindrical side wall surrounding the adjacent portion of said cable shield coaxially therewith and spaced therefrom, and an end wall closing said second cylindrical side wall at the end thereof disposed away from said second end of the cable shield and connected to the cable shield, the other end of the cylindrical side wall being open, and said cylindrical side wall having an effective electrical length equal to $n \lambda/4$, where $n$ is any odd integer; and the length of said cable is measured along said cable from the open end of said first choke cylindrical side wall to the open end of said second choke cylindrical side wall.

10. The apparatus of claim 8, wherein said first and second chokes and said cable are surrounded by a continuous layer of dielectric material.

11. Apparatus for monitoring the internal temperature of food being cooked in the cooking cavity of a microwave oven with microwaves of a predetermined frequency having a predetermined wavelength $\lambda$, said apparatus comprising:

a. a temperature-sensing probe adapted for insertion into the food to be cooked, said probe including an elongated conductive housing, the distal end of which is closed and shaped to facilitate insertion into the food, and said probe further including a thermally-responsive electrical element positioned internally of said housing near the distal end;

b. circuitry responsive to thermally-induced changes in a characteristic of said electrical element to produce a control effect indicative of the food temperature; and c. a flexible shielded cable connecting said electrical element to said circuitry, said cable having first and second ends and generally extending between said probe and a wall of the cooking cavity;

d. a choke for presenting a high impedance to microwave energy of wavelength $\lambda$, said choke being coupled to the cable shield at the first end thereof nearest said probe to electrically isolate said first end from said probe housing at the predetermined microwave frequency;

the total effective electrical length of said cable, measured along the cable from the cooking cavity wall to the choke, being approximately equal to $n\lambda/2$, where $n$ is any integer, whereby in use the cable is nonresonant at said predetermined wavelength $\lambda$, said electrical element is completely shielded from microwave energy, and the cable shield is isolated from said probe.

12. The apparatus of claim 11, wherein said first end of the cable is connected to the probe housing and said second end of the cable shield is connected to the cooking cavity wall;

said choke comprises a generally cup-shaped member having a cylindrical side wall surrounding the adjacent portion of said cable shield coaxially therewith and spaced therefrom, and an end wall closing said cylindrical side wall at the end thereof disposed away from said first end of the cable shield and connected to the cable shield, the other end of said cylindrical wall being open, and said cylindrical side wall having an effective electrical length equal to $n\lambda/4$, where $n$ is any odd integer; and the length of said cable is measured along said cable from the cavity wall to the open end of said choke cylindrical side wall.

13. Apparatus for monitoring the internal temperature of low impedance food being cooked in a microwave oven with microwaves of a predetermined wavelength, said apparatus comprisng a coaxial transmission line having an outer conductor grounded at one end thereof to the associated oven and an inner conductor, temperature-sensing means connected between the inner and outer conductors of said coaxial transmission line at the other end thereof, a conductive housing connected to said outer conductor of said transmission line adjacent to said other end thereof for cooperation therewith to surround said temperature-sensing means and shield it from microwave energy, said housing being adapted for insertion into the food being cooked to a predetermined reference point on said housing, indicator means coupled to said coaxial transmission line at said one end thereof and responsive to said temperature-sensing means for producing a signal indicative of the interior temperature of the associated food, filter structure coupled to the outer conductor of said transmission line adjacent to said one end thereof and defining an annular cavity having an effective electrical length equal to $\lambda/4$ where $\lambda$ is said predetermined wavelength for presenting a high impedance to microwave energy of wavelength $\lambda$, the effective electrical distance from the end of said cavity nearest said one end of said transmission line to said reference point on said housing being approximately equal to $n\lambda/2$ where $n$ is any integer, whereby in use said temperature sensing means is completely shielded from microwave energy and said indicator means and said transmission line are effectively isolated from microwave energy at said predetermined wavelength.

14. Apparatus for monitoring the internal temperature of low impedance food being cooked in a microwave oven with microwaves of a predetermined wavelength, said apparatus comprising a coaxial transmission line having an outer conductor grounded at one end thereof to the associated oven and an inner conductor, temperature-sensing means connected between the inner and outer conductors of said coaxial transmission line at the other end thereof, a conductive housing connected to said outer conductor of said transmission line adjacent to said other end thereof for cooperation therewith to surround said temperature-sensing means and shield it from microwave energy, said housing being adapted for insertion into the food being cooked to a predetermined reference point on said housing, indicator means coupled to said coaxial transmission line at said one end thereof and responsive to said temperature-sensing means for producing a signal indicative of the interior temperature of the associated food, first filter structure coupled to the outer conductor of said transmission line adjacent to said one end thereof and defining a first annular cavity having an effective electrical length equal to $\lambda/4$ where $\lambda$ is said predetermined wavelength for presenting a high impedance to microwave energy of wavelength $\lambda$, and second filter structure coupled to the outer conductor of said transmission line adjacent to said housing and defining a second annular cavity having an effective electrical length equal to $\lambda/4$ for presenting a high impedance to microwave energy of wavelength $\lambda$, the effective electrical distance from the end of said first cavity nearest said one end of said transmission line to the end of said second cavity nearest said other end of said transmission line being approximately equal to $n\lambda/4$ where $n$ is any odd integer, whereby in use said temperature-sensing means is completely shielded from microwave energy and said indicator means and said transmission line are effectively isolated from microwave energy at said predetermined wavelength.

* * * * *

UNITED STATES PATENT OFFICE
CERTIFICATE OF CORRECTION

PATENT NO. : 3,974,696
DATED : August 17, 1976
INVENTOR(S) : LOUIS H. FITZMAYER

It is certified that error appears in the above-identified patent and that said Letters Patent are hereby corrected as shown below:

In column 3, line 18, after "and" insert -- Ser. No. 447,087 being --.

In column 3, line 21, "sheilded" should read -- shielded --.

In column 11, line 43 (Claim 5), " $\lambda 14$" should read -- $\lambda/4$ --.

Signed and Sealed this nineteenth Day of July 1977

[SEAL]

Attest:

RUTH C. MASON
Attesting Officer

C. MARSHALL DANN
Commissioner of Patents and Trademarks